United States Patent
Wiese

[11] Patent Number: 5,180,265
[45] Date of Patent: Jan. 19, 1993

[54] SELF LOCKING NUT

[75] Inventor: David Wiese, Torrance, Calif.

[73] Assignee: Hi-Shear Corporation, Torrance, Calif.

[21] Appl. No.: 840,057

[22] Filed: Feb. 24, 1992

[51] Int. Cl.5 .............................. F16B 39/32
[52] U.S. Cl. ................. 411/150; 411/326
[58] Field of Search ......... 411/150, 313, 229, 261, 411/961, 108, 260, 314, 330, 960, 221, 326, 427, 432, 329

[56] References Cited

U.S. PATENT DOCUMENTS

| | | | |
|---|---|---|---|
| 292,513 | 1/1884 | Shailer | 411/150 X |
| 572,489 | 12/1896 | Lehmann | 411/330 |
| 779,632 | 1/1905 | Wolf | 411/326 |
| 1,394,740 | 10/1921 | Klocke | 411/229 X |
| 1,646,805 | 10/1927 | Bell | 411/961 X |
| 3,581,609 | 6/1971 | Greenwood | 81/121 |
| 3,851,690 | 12/1974 | Wing et al. | 151/8 |
| 3,942,570 | 3/1976 | Bochman, Jr. et al. | 151/8 |
| 4,971,501 | 11/1990 | Chavez | 411/330 X |

Primary Examiner—Rodney M. Lindsey
Attorney, Agent, or Firm—Donald D. Mon

[57] ABSTRACT

A lock nut to be threaded onto a threaded shank which has a keyway. The lock nut has a base, a key on the base to fit in the keyway, a peripheral wall with axial angularity spaced apart recesses, and a wave spring. The wave spring has ridges and radial tabs to fit in the recesses. An internally threaded nut has radially-extending grooves complementary to the ridges to hold the nut against rotation relative to the wave spring when the ridges fit in the grooves. The tabs can be contacted by a drive member to compress the wave spring and remove the ridges from the grooves to enable the nut to turn during installation and removal.

1 Claim, 1 Drawing Sheet

SELF LOCKING NUT

FIELD OF THE INVENTION

This invention relates to self-locking lock nuts, for example wheel bearing nuts, which when tightened retain their torqued condition, and which are readily released if desired.

BACKGROUND OF THE INVENTION

There are many applications where it is desired to tighten a nut to a given torque which will retain the torqued condition, without requiring the use of separate means such as cotter pins, or distortion of parts of the assembled joints.

A well-known application is in place of the conventional wheel bearing nut, in which one race of a wheel bearing is held to a spindle by a nut tightened to a predetermined torque. When the nut is appropriately tightened, it is backed off so one of its castellations is aligned with a cotter pin passage. A cotter pin is then passed through and its ends sent to hold the nut in a position which makes a near approximation to a desired torqued setting. Thereafter to remove the nut, the cotter pin is cut. Replacement involves a repetition of the first procedure.

The disadvantages of this arrangement have not gone unnoticed, and wheel bearing nuts have been devised which are self-locking in the sense, that the locking feature can be disabled by an installation tool while the nut is being tightened or released. Well-known examples are shown in Greenwood U.S. Pat. No. 3,581,609 and Wing et al U.S. Pat. No. 3,851,690. It is an object of this invention to improve on wheel bearing nuts of this general class.

Such nuts require the exertion of an axial force on some part of the nut assembly while exerting a tightening torque. This feature is utilized in the instant invention, also.

An examination of prior lock nuts of this class reveals that, even though some have been very successful, they require more parts than one would wish to use. Nuts of this type are used in the millions each year, and the elimination of a part can constitute a remarkable cost saving. The construction of this invention requires only three parts, all of which can be made with classic inexpensive procedures. For example, the more complicated parts can be made with powdered metal technology, thereby drastically reducing the cost of the nut.

Accordingly, it is an object of this invention to provide a self-locking lock nut which utilizes only the absolutely minimum number of parts (three), whose parts are very economical to manufacture and assemble, which is convenient to install and remove, and which is highly reliable as it must be for a part as critical as a wheel bearing nut.

BRIEF DESCRIPTION OF THE INVENTION

A self-locking nut assembly according to this invention includes a lock washer, a threaded nut, and a wave spring. The wave spring is disposed between the nut and the washer to exert a separative force between them.

The washer includes a key adapted to engage in a keyway in a spindle or shaft, and a plurality of axially extending recesses in a peripheral wall. The washer includes a plurality of radial ridges facing toward the nut.

The wave spring has a plurality of spring waves and a plurality of ridges facing toward the nut. It also has a plurality of retention tabs adapted to fit in the recesses in the washer. The spring is thereby held against rotation relative to the washer, and can exert an axial force on the washer.

The nut is internally threaded so it can be applied to a threaded spindle. It has an external non-circular drive section to receive a torque tool. Usually it will be hexagonal. A plurality of radial grooves faces the wave spring where they can variously engage ridges on the wave spring to restrain the nut against rotation relative to the wave spring and thereby also relative to the washer and the spindle.

The retention tabs extend axially beyond an exposed part of the nut so that an installation tool can engage the drive section, and also bear against the retention tabs whereby to move the ridges out of engagement with the radial grooves so the nut can be turned relative to the washer. When the tool is removed, the tabs will be driven axially and the nut assembly will be locked.

The above and other features of this invention will be fully understood from the following detailed description and the accompanying drawings, in which:

DETAILED DESCRIPTION OF THE INVENTION

Figure 1:
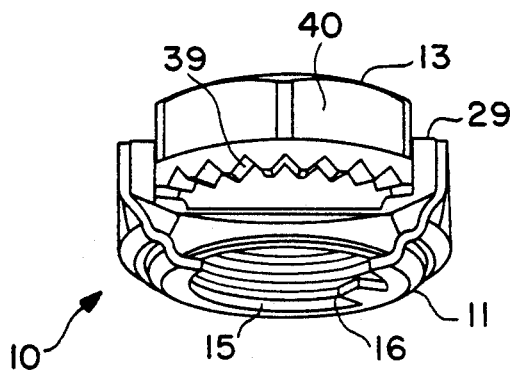
FIG. 1 is a partially cutaway perspective assembly view of the preferred embodiment of the invention, looking upwardly.
Figure 2:
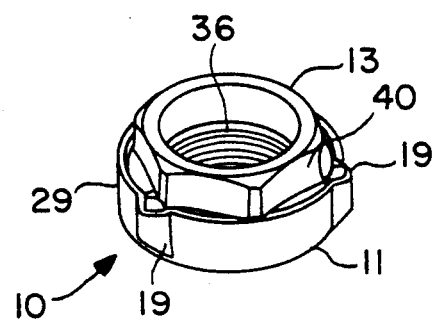
FIG. 2 is a perspective view of the nut of FIG. 1, looking downwardly.

A lock nut 10 according to this invention is made from only three parts: a lock washer 11, a wave spring 12, and a nut 13.

Lock washer 11 has a central opening 15 to pass a threaded hub or spindle (not shown). It has a key 16 which projects into the opening to engage in a spline groove in the spindle. The lock washer will thereby be retained against rotation around the spindle, and this provides the basis for locking of the nut after installation.

The lock washer has a peripheral wall 17 which rises from a base 18. The base is intended to bear against the retainer or race which is to be held in place by the lock nut. The peripheral wall has a plurality (conveniently three) of axial recesses 19 which extend downwardly from the top edge 20 of the peripheral wall.

Wave spring 12 is made of springy metal, and is formed with a plurality of waves 26 (preferably three). The waves preferably have a substantial width. A lower portion 27 of each wave bears against the base of the washer. The waves rise to a plurality of ridges 28 at which there are formed a plurality (again preferably three) of axially-extended retention tabs 29. These tabs fit nearly in respective recesses 19 in the peripheral wall of the lock washer. They are complementarily shaped relative to the recesses so that wave spring is retained against rotation relative to the lock washer. In the released condition of the wave spring, the tabs rise above the top edge of the peripheral wall so they can be contacted by an installation tool. They are shorter than the recesses so they can be pressed downwardly for a purpose yet to be described.

A nut 13 has an internal thread 36 for threading onto the thread of a hub or spindle. Its length is such that it bottoms out on the base of the lock washer. When not locked, it is rotatable relative to the lock washer.

Nut 13 has a peripheral shoulder 37 with an upper face 38 which is preferably disc-like, and a lower serrated face with a plurality of radially-extending grooves 39 which face ridges 28. The ridges and grooves have complementary shapes which lock the nut against rotation relative to the spring when the spring is free. A suitable number of grooves 39 is formed to enable the lock nut to be locked very closely to its desired torque position.

Nut 13 has a non-circular drive section 40, conveniently hexagonal, for engagement to a torque tool 41, usually a hexagonal drive socket.

The assembly of parts is held together by staking over the top edge 20 of the lock washer at two or three places so it overhangs upper face 38 of the nut.

Figure 3:
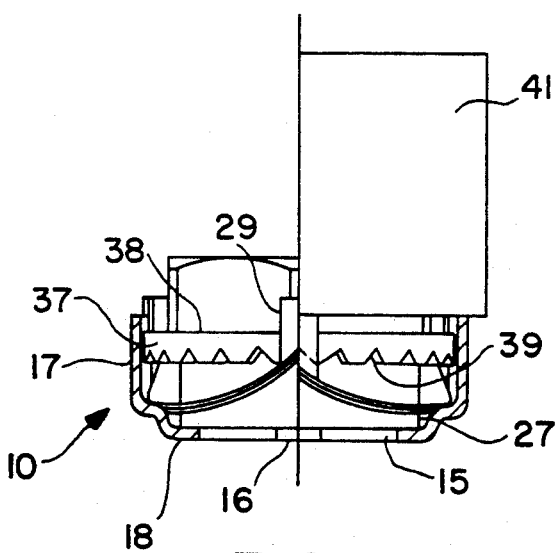
FIG. 3 is a cross-section taken at line 3—3 in FIG. 1, divided to show the parts in two different conventions.
Figure 4:
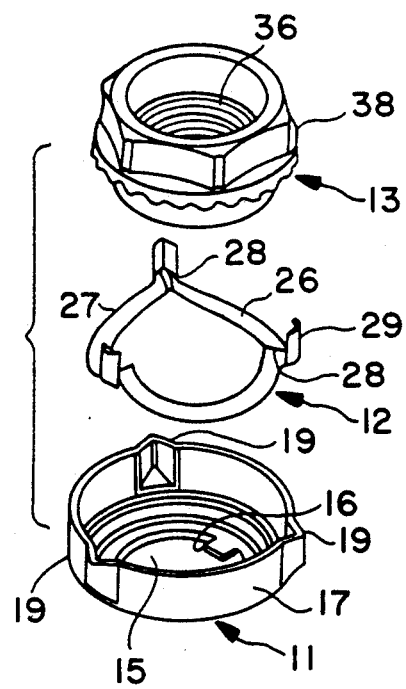
FIG. 4 is an exploded view of FIG. 1.

The right hand portion of FIG. 3 shows the lock nut in its condition for installation. The lock nut is placed on the spindle and the threads are started. The key fits in the keyway of the spindle. Then the drive tool is applied both to turn nut 13 and to depress the retention tabs 29. As can be seen, this moves the ridges out of the grooves, and frees the nut for turning relative to the lock washer.

When the desired torque has been applied, the socket will be removed, and the wave spring will return the ridges toward to the locking-position shown on the left hand position of FIG. 3. The lock nut is now locked to the spindle.

It might occur that when fully tightened, the ridges will be at a position such that they do not fully enter the recesses. This does no harm. It merely means that if the lock nut does begin to unthread, this action will be stopped as soon as the full engagement does occur, which will be within a few degrees of rotation determined by the number of grooves provided and the pitch of the threads. This number will be such as to assure that an adequate torque will always be maintained.

The parts of this lock nut are simple in construction and the fewest possible in number. They will all be made of widly available material by well-known manufacturing methods.

This invention is not to be limited by the embodiment shown in the drawings and described in the description, which is given by way of example and not of limitation, but only in accordance with the scope of the appended claims.

I claim:

1. A lock nut for being threaded onto and locked onto a threaded member such as a spindle, said threaded member and lock nut have a central axis and said threaded member having an axially extending keyway, said lock nut comprising:

a lock washer having a base, a central opening in said base, a key extending from said base into said opening to engage in said keyway, a peripheral wall rising from said base, said peripheral wall having a top edge, and a plurality of axially extending recesses in said peripheral wall, angularly spaced apart from one another, said recesses extending downwardly from said top edge;

a wave spring within said peripheral wall, said wave spring including a plurality of waves which include a bottom portion abutting said base, a plurality of ridges, and a plurality of retention tabs radially outward from said ridges and extending upwardly above them, fitting in said recesses in the peripheral wall and rising above said top edge of said peripheral wall;

a nut having an internal thread, a non-circular drive section, a bottom face abutting said base of said lock washer, a shoulder having an upper face and a lower face, said lower face facing toward said wave spring and said base, and having a plurality of radially-extending grooves facing and complementary to said ridges on said wave spring so as to hold the nut against rotation relative to said wave spring when the ridges are fitted in grooves, said upper face being engaged by a portion of the peripheral wall to hold the lock nut assembled, said retention tabs being so disposed and arranged as to be contactible by a drive member to compress the wave spring and remove the ridges from the grooves to enable the nut to turn relative to the lock washer during installation or removal.

* * * * *